(12) United States Patent  
Garcia Martin et al.

(10) Patent No.: US 9,191,960 B2  
(45) Date of Patent: Nov. 17, 2015

(54) METHODS AND APPARATUS FOR MITIGATING SERVICE INTERRUPTION

(71) Applicant: TELEFONAKTIEBOLAGET LM ERICSSON (publ), Stockholm (SE)

(72) Inventors: Miguel Angel Garcia Martin, Pozuelo de Alarcon (ES); Pablo Martinez de la Cruz, Madrid (ES); Patricia Sanchez Canton, Madrid (ES)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 225 days.

(21) Appl. No.: 13/896,707

(22) Filed: May 17, 2013

(65) Prior Publication Data

US 2013/0322365 A1    Dec. 5, 2013

Related U.S. Application Data

(60) Provisional application No. 61/663,783, filed on Jun. 25, 2012.

(30) Foreign Application Priority Data

May 31, 2012  (EP) ..................................... 12170321

(51) Int. Cl.
*H04W 72/04*  (2009.01)
*H04L 12/24*  (2006.01)

(52) U.S. Cl.
CPC ......... *H04W 72/048* (2013.01); *H04L 41/0893* (2013.01)

(58) Field of Classification Search
CPC .................................................. H04W 72/048
USPC ........................... 370/328–339; 709/223–228
See application file for complete search history.

(56) References Cited

U.S. PATENT DOCUMENTS

| 2009/0182883 A1* | 7/2009 | Giaretta et al. ............... 709/228 |
| 2012/0036186 A1  | 2/2012 | Mariblanca Nieves |

(Continued)

FOREIGN PATENT DOCUMENTS

| WO | WO 2010/051853 | 5/2010 |
| WO | WO 2010/112080 | 10/2010 |
| WO | WO 2011/101021 | 8/2011 |

OTHER PUBLICATIONS

3GPP TS 23.203, "3$^{rd}$ Generation Partnership Project; Technical Specification Group Services and System Aspects; Policy and Charging Control Architecture (Release 11)," V11.5.0, Mar. 2012.

(Continued)

*Primary Examiner* — Iqbal Zaidi
(74) *Attorney, Agent, or Firm* — Baker Botts, LLP

(57) ABSTRACT

The present invention provides methods and apparatus for mitigating service interruption that occurs due to a change in the IP address of a UE that is receiving a service under control of a Policy and Charging Control (PCC) architecture. According to these methods, a Policy and Charging Rules Function (PCRF) of the PCC architecture is configured to determine when a change in the IP address of the UE is imminent, and to take temporary actions to mitigate the service interruption perceived by the user of the UE. The PCRF is also configured to trigger a notifications intended for at least one of the UE and any Application Function (AF) that is providing the service to the UE that a change in the IP address of the UE will occur imminently. The UE and AF are therefore also able to anticipate the change in the IP address and take action to mitigate the service interruption perceived by the user prior to the change in the IP address taking place.

11 Claims, 7 Drawing Sheets

(56) References Cited

U.S. PATENT DOCUMENTS

2013/0182715 A1* 7/2013 Pandya et al. .................. 370/401
2013/0326034 A1* 12/2013 Shaik et al. ................... 709/223

OTHER PUBLICATIONS

Search Report for EP 12170321.9 dated Dec. 4, 2012.
3GPP TS 29.214, "3$^{rd}$ Generation Partnership Project; Technical Specification Group Core Network and Terminals; Policy and Charging Control Over Rx Reference Point (Release 11)," V11.4.0, Mar. 2012.
3GPP TS 29.212, "3$^{rd}$ Generation Partnership Project; Technical Specification Group Core Network and Terminals; Policy and Charging Control (PCC) Over Gx/Sd Reference Point (Release 11)," V11.40, Mar. 2012.
3GPP TS 23.402, "3$^{rd}$ Generation Partnership Project; Technical Specification Group Services and System Aspects; Architecture Enhancements for Non-3GPP Accesses (Release 11)," V11.2.0, Mar. 2012.

* cited by examiner

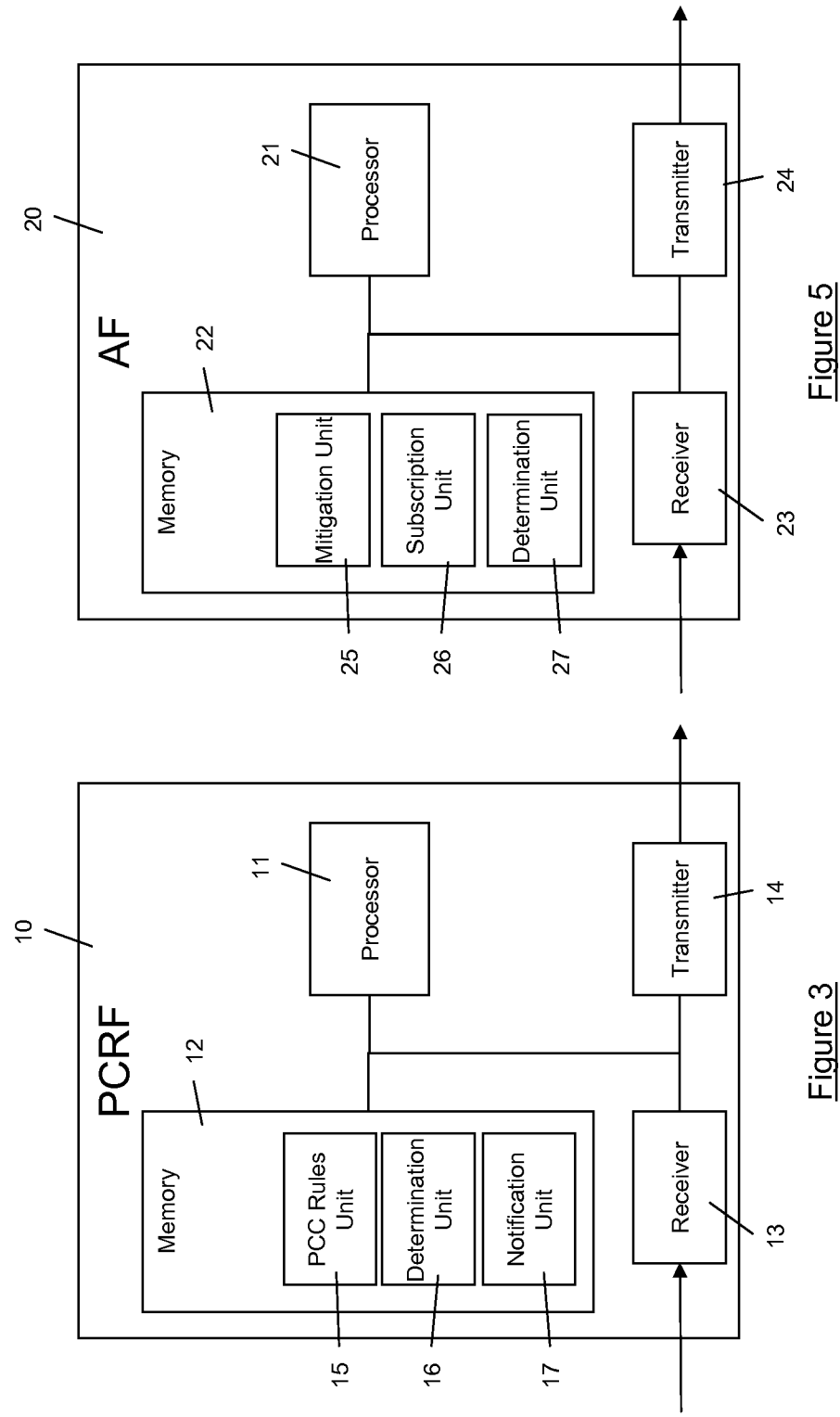

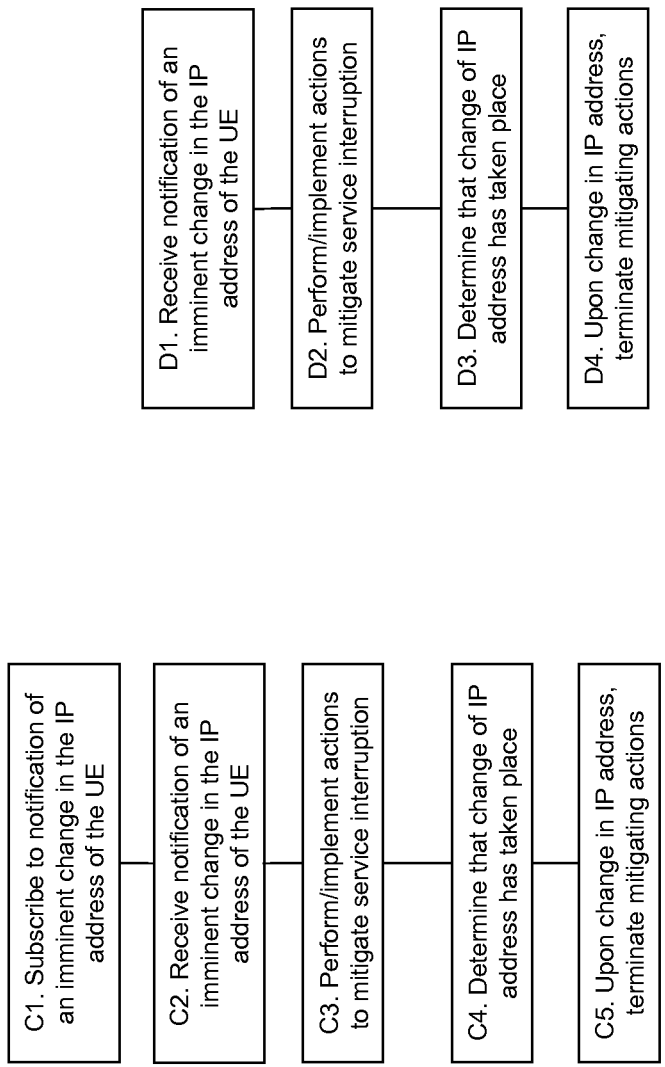

METHODS AND APPARATUS FOR MITIGATING SERVICE INTERRUPTION

This application is a non-provisional application claiming priority to U.S. Provisional Application No. 61/663,783, filed Jun. 25, 2012, and EP 12170321.9 filed May 31, 2012, the entire contents of each of which are hereby incorporated by reference.

TECHNICAL FIELD

The present invention relates to methods and apparatus for mitigating service interruption that occurs due to a change in the IP address of a UE that is receiving a service under control of a Policy and Charging Control (PCC) architecture.

BACKGROUND

Telecommunications services provided over an IP Connectivity Access Network (IP-CAN) can be subject to charging and policy control mechanisms. This includes service-aware Quality of Service (QoS) control. Accordingly, some telecommunications systems incorporate Policy and Charging Control (PCC) architectures to provide this control. 3GPP TS 23.203 describes such a PCC architecture in respect of packet flows in an IP-CAN session established by a user terminal through an Evolved 3GPP telecommunications system, including both 3GPP accesses (GERAN/UTRAN/E-UTRAN) and Non-3GPP accesses. FIG. 1 illustrates schematically an example of the PCC architecture described in 3GPP TS 23.203 that comprises a Policy and Charging Enforcement Function (PCEF), a Policy and Charging Rules Function (PCRF), an Application Function (AF), an Online Charging System (OCS), an Offline Charging System (OFCS) and a Subscription Profile Repository (SPR). The architecture can also include a Bearer Binding and Event Reporting Function (BBERF).

The PCRF is a functional element that encompasses policy control decision and flow based charging control functionalities, a combination of the functionality of the Policy Decision Function (PDF) and the Charging Rule Function (CRF) defined in release 6 of the 3GPP specification. A PCRF can be implemented as a standalone node and behaves as a Policy Decision Point (PDP), or Policy Server (PS), that stores user data related to QoS enforcement, access control lists, etc. The PCRF provides policy and charging control for the media components negotiated between the user terminal and the AF. The PCRF receives session and media related information from the AF and informs the AF of traffic plane events. The PCRF also provides network control regarding the service data flow detection, gating, QoS and flow based charging (except credit management) towards the PCEF. The PCRF can provision PCC rules and PCC decisions to the PCEF via a so-called Gx reference point and to the BBERF through a so-called Gxa/Gxc (also referred to as Gxx) reference point. The PCRF also forwards events between the BBERF, the PCEF, and the AF. Criteria such as the QoS subscription information may be used together with policy rules such as service-based, subscription-based, or pre-defined PCRF internal policies to derive the authorized QoS to be enforced for a service data flow. The PCRF PCC decisions may be based on one or more of the following:

information obtained from the AF via a so-called Rx reference point, e.g. the session, media and subscriber related information;

information obtained from the PCEF via the Gx reference point, e.g. IP-CAN bearer attributes, request type, subscriber related information and location information;

information obtained from the SPR via a so-called Sp reference point, e.g. subscriber and service related data;

information pre-defined in the PCRF; and information obtained from BBERF via the Gxa/Gxc (also referred to as Gxx) reference points.

The PCEF is a functional entity that behaves as a Policy Enforcing Point (PEP) for enforcing decisions instructed by the PCRF and the OCS. The PCEF provides service data flow detection (based on service data flow filters defined in the PCC rules) to capture and analyse any user and signalling traffic, to identify the user and to capture details of the service(s) being used. The PCEF can then communicate this user and access-specific information to the PCRF over the Gx interface, to the OCS over a so-called Gy interface and to the OFCS over a so-called Gz interface. The PCEF enforces QoS control according to the QoS authorised by the PCRF. The PCEF is preferably co-located within a gateway node implementing the IP access to a Packet Data Network (PDN GW). As such, in a General Packet Radio Service (GPRS) core network the PCEF is located within a GPRS Gateway Support Node (GGSN), whilst in the case of a CDMA2000 network the PCEF may be located in a Packet Data Serving Node (PDSN), and in a WLAN network the PCEF may be located in a Packet Data Gateway (PDG).

The BBERF supports a subset of the functions provided by the PCEF that includes bearer binding, uplink bearer binding verification and event reporting to the PCRF.

Bearer binding is the association of a PCC rule and a QoS rule (if applicable) to an IP-CAN bearer within that IP-CAN session, and is performed by the Bearer Binding Function (BBF). The BBF is located at the PCEF if GPRS Tunnelling Protocol (GTP) is used as the mobility protocol towards the PCEF. Otherwise, where a mobile-IP based protocol, such as Mobile IP (MIP), is used instead of GTP, the BBF is located at the BBERF. The QoS rules contain the information from the PCC rules that the BBERF requires to ensure that bearer binding can be performed. The QoS rules therefore contain the SDF template and precedence information, as well as the QoS information (e.g. QCI, bit rates etc). The PCRF provides the BBERF with the QoS rules derived from the PCC rules. The BBERF then enforces the QoS decisions by setting up the appropriate bearers. The Gxx reference point represents the Gxa or Gxc reference points as applicable in each particular context. Gxc applies when the BBERF is located in the S-GW of a 3GPP access, whereas Gxa applies when the BBERF is located in a trusted non-3GPP access.

The AF is an element offering applications that require policy and/or charging control of the IP-CAN user plane behaviour. The AF communicates with the PCRF over the Rx interface to transfer dynamic session information (e.g. a description of the media to be delivered in the transport layer) required for PCRF decisions, as well as to receive IP-CAN specific information and notifications about IP-CAN bearer level events. One example of an AF is the Proxy Call/Session Control Function (P-CSCF) of the IP Multimedia Subsystem (IMS). In the case of a P-CSCF, the information communicated over the Rx interface is derived from the P-CSCF session information and it mainly includes media components. A media component comprises a set of IP flows, each of which is described by a 5-tuple, the media type and required bandwidth. The AF can also subscribe to certain events that occur at the traffic plane level (i.e., events detected by either the PCEF or be BBERF). Those traffic plane events include events such as IP session termination or access technology-type change. When the AF has subscribed to a traffic plane event, the PCRF informs the AF of its occurrence.

The SPR contains all subscriber/subscription related information needed for subscription-based policies and IP-CAN bearer level PCC rules by the PCRF. The Sp interface allows the PCRF to request subscription information related to the IP-CAN policies from the SPR based on a subscriber ID and other IP-CAN session attributes.

For a UE attached to an IP-CAN, there may be various circumstances in which it is required that the IP address allocated to the UE must change whilst the UE is receiving a service provided through the IP-CAN. A typical example of such a scenario is when a UE is connected to a core network via a first IP-CAN and either the core network or the UE determines that the UE should change to an alternative second IP-CAN and, in particular, where the first IP-CAN and second IP-CAN implement heterogeneous access network technologies (i.e. are 3GPP and non-3GPP access networks). In this regard, both IPv4 and IPv6 address consist of a network prefix and a host/interface identifier. Therefore, when the UE moves from the first IP-CAN to the alternative second IP-CAN, the network prefix of the second IP-CAN will be different to that of the first IP-CAN, such that the IP address of the UE must change.

A change in the IP address allocated to a UE will result in an interruption of any existing streams of IP packets (i.e. IP flows) sent to and from the UE, and this will cause an interruption in any services that are currently being accessed by/provided to the user of the UE. In this regard, whilst an interruption of the service might not be considered a severe problem when the user is browsing the web (i.e. due to the bursty nature of web browsing), an interruption in a streaming service such as IPTV, video downloading, application downloading, etc, might be considered a severe disruption by the user.

The current solutions for mitigating against the problem of service interruption due to a change in the IP address of a UE are implemented in either the IP protocol stack or the application layer. Solutions that are implemented in the IP protocol stack make use of a shim layer that takes care and minimizes the effect of changing the IP address of the device. Examples of these solutions include Mobile IPv4, Mobile IPv6, Proxy Mobile IPv6, and Host Identity Protocol (HIP). However, these solutions that require a change the IP protocol stack are complex in nature, requiring significant changes in devices, programming Application Program Interfaces (APIs), infrastructure, configuration, etc. As a result, the trend is to provide application layer solutions in which those applications that are impacted upon by a change in the IP address attempt to minimize the perceived service interruption. However, these application layer solutions therefore require that each individual application that could be affected by such a change is updated so as to implement such a solution.

SUMMARY

It is an object of the present invention to overcome, or at least mitigate the problems identified above.

According to a first aspect of the present invention there is provided a method of mitigating a service interruption that occurs due to a change of an IP address of a User Equipment (UE) that is receiving a service under control of a Policy and Charging Control (PCC) architecture. The method, as implemented at a Policy and Charging Control Rules Function (PCRF) of the PCC architecture, comprises the steps of:

receiving a service authorization request for the service from an Application Function (AF) in charge of service delivery to the UE;

determining first PCC rules to apply for the service and submitting said first PCC rules to a Policy and Charging Enforcement Function (PCEF) of the PCC architecture for enforcement of quality of service on a bearer established for the service;

determining that a change of the IP address of the UE is required imminently;

before the change of the IP address takes place, determining and submitting to the PCEF second PCC rules to apply that increase resources for the bearer in order to mitigate the service interruption perceived at the UE;

triggering a notification of an imminent change of the IP address of the UE to at least one of the UE and the AF; and upon determining that the change of the IP address of the UE has taken place, determining and submitting to the PCEF third PCC rules to apply that discontinue the mitigating increase in the resources for the bearer.

The method may further comprise a step of receiving, from the AF, a subscription to notification of an imminent change of IP address of the UE. The method may also further comprise a step of, upon determining that the change of the IP address of the UE has taken place, sending a notification to the AF that the change of the IP address of the UE has taken place.

The step of triggering a notification to the UE of an imminent change of the IP address of the UE includes may comprise a step of sending such notification to the UE.

The step of determining that a change of the IP address of the UE is required imminently may comprise a step of determining that a change from a first access network, which is currently used by the UE to route service data flows of the service, to a second access network is required imminently. The step of determining that a change from a first access network to a second access network is required imminently includes a step of detecting any one of congestion in a cell in which the UE is currently located, a change in the location of the UE, a change in a user category of a user associated with the UE, a change in the time or date, and reaching a usage threshold. Upon determining that a change from a first access network to a second access network is required imminently, the method may further comprise a step of sending a notification of an imminent change of the IP address of the UE to an Access Network Discovery and Selection Function, ANDSF, in order to establish an access network selection policy for the UE selecting the second access network.

It may be determined that the change of the IP address of the UE has taken place upon receipt, from the PCEF, of a request for authorizing a new bearer and for PCC rules for the second access network. The method may then further comprise a step of sending to the AF a notification of the establishment of a new bearer for the service through the second access network.

According to a second aspect of the present invention there is provided a method of method of mitigating a service interruption that occurs due to a change of an IP address of a UE that is receiving a service under control of a PCC architecture. The method, as implemented at an AF of the PCC architecture, comprises the steps of:

submitting a service authorization request for the service to a PCRF of the PCC architecture;

receiving a notification, from the PCRF, of an imminent change of the IP address of the UE;

before the change of the IP address takes place, performing at least one of increasing a rate at which service data is sent to the UE and decreasing the quality of service for the service, in order to mitigate the service interruption perceived at the UE; and upon determining that the change of the IP address of the UE has taken place, discontinuing any mitigating change in the at least one of the rate at which service data is sent to the UE and the quality of service for the service.

The method may further comprise a step of submitting, to the PCRF, a subscription to notification of an imminent change of IP address of the UE. It may be determined that the change of the IP address of the UE has taken place upon receipt from the PCRF of a notification of having completed the change of the IP address of the UE.

If the change of the IP address of the UE is due to a change from a first access network, which is currently used by the UE to route service data flows of the service, to a second access network, then the method may further comprise a step of receiving from the PCRF a notification of the establishment of a new bearer for the service through the second access network. Then, it may be determined that the change of the IP address of the UE has taken place upon receipt of the notification of the establishment of a new bearer for the service through the second access network.

According to a third aspect of the present invention there is provided a method of mitigating a service interruption that occurs due to a change of an IP address of a UE that is receiving a service under control of a PCC architecture. The method, as implemented at the UE, comprises the steps of:

receiving a notification of an imminent change of the IP address of the UE, the notification triggered from a PCRF of the PCC architecture;

before the change of the IP address takes place, performing at least one of increasing size of a receiving buffer, decreasing the quality of service for the service, and lowering rendering consuming resources at the UE, in order to mitigate the service interruption perceived at the UE; and upon determining that the change of the IP address of the UE has taken place, discontinuing any mitigating change in the at least one of the size of a receiving buffer, the quality of service for the service, and the rendering consuming resources at the UE.

The notification of an imminent change of the IP address of the UE may be received at the UE from the PCRF. Alternatively, the notification of an imminent change of the IP address of the UE may be received at the UE from an Access Network Discovery and Selection Function (ANDSF) in charge of establishing policies for the UE. The notification received from the ANDSF may include an access network selection policy, and the method may further comprise a step of using the access network selection policy to select a new access network to be used by the UE to route service data flows of the service. If so, then the method may further comprises the steps of attaching to the new access network in accordance with the access network selection policy, initiating the establishment of a new bearer in the new access network, and obtaining a new IP address of the UE from the new access network.

According to a fourth aspect of the present invention there is provided a Policy and Charging Control Rules Function (PCRF) of a PCC architecture, that is configured to mitigate a service interruption that occurs due to a change of an IP address of a User Equipment, UE, that is receiving a service under control of the PCC architecture.

The PCRF comprises a receiver configured to receive a service authorization request for the service from an AF in charge of service delivery to the UE;

a PCC rules unit configured to determine first PCC rules to apply for the service;

a transmitter configured to send said first PCC rules to a PCEF of the PCC architecture for enforcement of quality of service on a bearer established for the service;

a determination unit configured to determine that a change of the IP address of the UE is required imminently;

the PCC rules unit being further configured to, before the change of the IP address takes place, determine second PCC rules to apply that increase resources for the bearer in order to mitigate the service interruption perceived at the UE;

the transmitter being further configured to send the second PCC rules to the PCEF; and a notification unit configured to trigger a notification of an imminent change of the IP address of the UE to at least one of the UE and the AF;

the PCC rules unit being further configured to, upon a determination that the change of the IP address of the UE has taken place, determine third PCC rules to apply that discontinue the mitigating increase in the resources for the bearer; and the transmitter being further configured to send the third PCC rules to the PCEF.

The receiver may be further configured to receive, from the AF, a subscription to notification of an imminent change of IP address of the UE. The transmitter may be further configured to send a notification of having completed the change of the IP address of the UE, upon a determination that the change of the IP address of the UE has taken place.

The notification unit may be configured to trigger a notification of an imminent change of the IP address of the UE to the UE by generating and sending a notification to the UE.

The determination unit may be configured to determine that a change of the IP address of the UE is required imminently by determining that a change from a first access network, which is currently used by the UE to route service data flows of the service, to a second access network is required imminently. The determination unit may then be configured to determine that a change from a first access network to a second access network is required imminently by detecting any one of congestion in a cell in which the UE is currently located, a change in the location of the UE, a change in a user category of a user associated with the UE, a change in the time or date, and reaching a usage threshold. If so, then upon determining that a change from a first access network to a second access network is required imminently, the notification unit may be configured to send a notification of an imminent change of the IP address of the UE to an ANDSF in order to establish an access network selection policy for the UE selecting the second access network. The determination unit may be configured to determine that the change of the IP address of the UE has taken place upon receipt from the PCEF of a request for authorizing a new bearer and for PCC rules for the second access network. The notification unit may then be further configured to generate and send, to the AF, a notification of the establishment of a new bearer for the service through the second access network.

According to a fifth aspect of the present invention there is provided an Application Function (AF) of a PCC architecture that is configured to mitigate a service interruption that occurs due to a change of an IP address of a UE that is receiving a service from the AF under control of the PCC architecture. The AF comprises:

a transmitter configured to submit a service authorization request for the service to a PCRF of the PCC architecture;

a receiver configured to receive a notification from the PCRF of an imminent change of the IP address of the UE;

a mitigation unit configured to, before the change of the IP address takes place, perform at least one of increasing a rate at which service data is sent to the UE and decreasing the quality of service for the service, in order to mitigate the service interruption perceived at the UE, and, upon a determination that the change of the IP address of the UE has taken place, to discontinue any mitigating change in the at least one of the rate at which service data is sent to the UE and the quality of service for the service.

The AF may further comprise a subscription unit configure to send to the PCRF a subscription to notification of an imminent change of IP address of the UE.

The AF may further comprise a determination unit configured to determine that the change of the IP address of the UE has taken place upon receipt from the PCRF of a notification of having completed the change of the IP address of the UE.

The receiver may be configured to receive from the PCRF a notification of the establishment of a new bearer for the service through a new access network. In this case, the AF may further comprise a determination unit configured to determine that the change of the IP address of the UE has taken place upon receipt of the notification of the establishment of a new bearer for the service through the new access network.

According to a sixth aspect of the present invention there is provided a User Equipment (UE) configured to receive a service under control of a PCC architecture and to mitigate a service interruption that occurs due to a change of an IP address of the UE. The UE comprises:

a receiver configured to receive a notification of an imminent change of the IP address of the UE;

a mitigation unit configured to, before the change of the IP address takes place, perform at least one of increasing size of a receiving buffer, decreasing the quality of service for the service, and lowering rendering consuming resources at the UE, in order to mitigate the service interruption perceived at the UE, and, upon a determination that the change of the IP address of the UE has taken place, to discontinue any mitigating change in the at least one of the size of a receiving buffer, the quality of service for the service, and the rendering consuming resources at the UE.

The receiver may be configured to receive the notification of an imminent change of the IP address of the UE from a PCRF of the PCC architecture. Alternatively, the receiver may be configured to receive the notification of an imminent change of the IP address of the UE from an ANDSF in charge of establishing policies for the UE.

The UE may then further comprise an access network selection unit configured to use an access network selection policy received in from the ANDSF to select a new access network that is to be used by the UE to route service data flows of the service. The UE may then further comprise an access network attachment unit configured to attach to the new access network in accordance with the access network selection policy, initiate the establishment of a new bearer in the new access network, and obtain a new IP address of the UE from the new access network.

BRIEF DESCRIPTION OF THE DRAWINGS

Aspects of the present invention will now be further described, by way of example only, with reference to the accompanying figures:

FIG. 3 illustrates schematically an example of a PCRF configured to mitigate service interruption in accordance with the methods described herein;

FIG. 5 illustrates schematically an example of an AF 20 configured to mitigate service interruption in accordance with the methods described herein;

FIG. 6 is a flow diagram illustrating the steps performed by an AF in order to mitigate service interruption in accordance with the methods described herein;

FIG. 8 is a flow diagram illustrating the steps performed by an AF in order to mitigate service interruption in accordance with the methods described herein.

DETAILED DESCRIPTION

Figure 1:
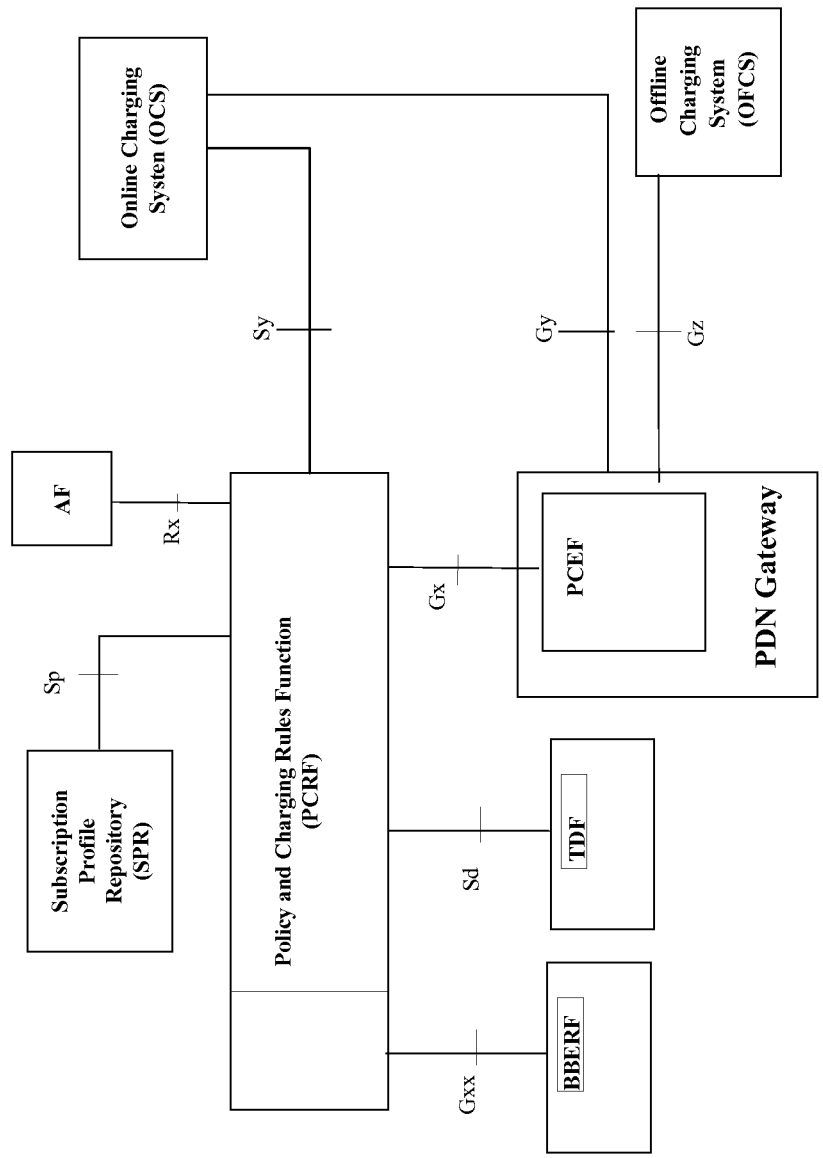
FIG. 1 illustrates schematically an example of the PCC architecture.

There will now be described a method of mitigating service interruption that occurs due to a change in the IP address of a UE that is receiving a service under control of a Policy and Charging Control (PCC) architecture. According to this method, a Policy and Charging Rules Function (PCRF) of the PCC architecture is configured to determine when a change in the IP address of the UE is imminent, and to take temporary actions to mitigate the service interruption perceived by the user of the UE. The PCRF is also configured to trigger a notification intended for the UE and for any Application Function (AF) that is providing the service to the UE that a change in the IP address of the UE will occur imminently. The UE and AF are therefore also able to anticipate the change in the IP address and take action to mitigate the service interruption perceived by the user prior to the change in the IP address taking place.

In order to implement this method, the PCRF could be configured to identify events that imply that a change in the IP address of the UE is imminent, or that imminently require a change in the IP address of the UE. For example, the PCRF can be configured with triggers that enable it to determine/decide that the UE will imminently be required to change access network. Such a trigger could be fired upon the detection of congestion in a cell, a change in the location of the UE, a change of date or time, the reaching of a resource usage threshold/quota etc. In such a scenario, the PCRF would also be configured to know that an imminent change in the access network used by the UE implies that a change in the IP address of the UE will also be required.

The PCRF is further configured such that, upon determining that a change in the IP address of the UE is imminent, and before the change in the IP address takes place, it will determine new PCC rules to apply to the service (i.e. to replace the PCC rules that are currently applied to the service) that increase the resources for the bearer established for the service. The PCRF then sends these new PCC rules to the PCEF that is enforcing the QoS for the bearer. In doing so, prior to the change in the IP address of the UE, the PCRF temporarily allows the notified AF to send data to the UE at an increased rate, and therefore serves to mitigate the service interruption perceived by the user. For example, if the AF is providing a media streaming service to the UE, this temporarily increased rate will allow the AF to provide the UE with an increased volume of the media data that the UE can then buffer. The increased volume of media data stored in the buffer of the UE can therefore enable the UE to continue playing media to the user during the service interruption that subsequently occurs at the time of the change of IP address.

In addition, the PCRF is configured to trigger a notification that a change in the IP address of the UE is required imminently to one or both of the UE and the AF that is providing a service to the UE. For example, to notify the AF, the PCRF can be configured to send a Diameter Re-Authorisation Request (RAR) message to the AF over the Rx interface. In this regard, the RAR message includes a Specific-Action AVP that is used to indicate the reason/cause for the notification sent to the AF. However, the standards that define the values that can be included within the Specific-Action AVP for the RAR messages do not define a value that can be used to indicate that a change in the IP address of the UE will occur imminently. The Rx interface would therefore require extension in order to implement the methods described herein. For example, the Specific-Action AVP could be extended to include a value "CHANGE_OF_UE_IP_ADDRESS" that indicates to the AF that a change in the IP address of the UE will occur imminently. Similarly, this "CHANGE_OF_UE_IP_ADDRESS" value could be included within the Specific-Action AVP of an initial Authenticate and Authorize Request (AAR) message, sent by the AF to the PCRF to request that the PCRF send a notification to the AF when a change in the IP address of the UE will occur imminently; in other words, this latter AVP can be used for the AF subscribing to such notification.

To notify the UE, the PCRF can be configured to send a push SMS to the UE including an indication that a change in the IP address of the UE will occur imminently. In addition, if it is determined that the change in the IP address of the UE is due to a change in the IP-CAN used by the UE to route service data flows of the service, then the PCRF can be configured to interact with an Access Network Discovery and Selection Function (ANDSF) in order to establish an access network selection policy for the UE, wherein an ANDSF is an entity defined by 3GPP that provides inter-system mobility policies and access network specific information to UEs. The ANDSF will then initiate a data transfer to the UE using a push mechanism to notify the UE that a new access network selection policy is available. For example, the ANDSF can generate and send a push SMS to the UE instructing the UE to retrieve a new access network selection policy.

As an alternative, in circumstances in which the change in the IP address of the UE is due to a change in the IP-CAN used by the UE, the UE could use communication with the ANDSF as an indication that an imminent change in the IP-CAN used by the UE is required, as this communication could imply that a change in the IP address of the UE will also be required. The interaction of the PCRF with the ANDSF would therefore trigger the sending of a notification to the UE by the ANDSF.

Upon determining that a change in the IP address of the UE has taken place, the PCRF is further configured to determine yet further PCC rules to apply to the service (i.e. to replace the new PCC rules that increased the available resources) that return/restore/adapt the resources for the bearer to normal or appropriate levels. The PCRF then sends these further PCC rules to the PCEF. For example, these further PCC rules may restore the resources available for the bearer to the levels available before the increase. However, the standard (i.e. not increased) resources available for the bearer after the change in the IP address may be different to the standard resources available before the change in the IP address, such that the further PCC rules, which are intended to discontinue/cease the mitigating increase in the available resources, may not necessarily restore the resources to the same level as available before the increase. In addition, the PCRF can also be configured to notify the AF that the change in the IP address of the UE has taken place.

In addition to the mitigating action taken by the PCRF, the AF can also be configured to anticipate the change and take temporary actions to mitigate the service interruption perceived by the user of the UE. To do so, the AF is configured to receive a notification from the PCRF of an imminent change in the IP address of the UE. For example, in accordance with the procedures for subscribing to notifications regarding the status of the AF signalling transmission path outlined above, the AF can be configured to send an initial Authenticate and Authorize Request (AAR) message to the PCRF upon establishment of the session between the AF and the UE, the AAR message including a Specific-Action AVP with a value of "CHANGE_OF_UE_IP_ADDRESS". The AF will thereby request that the PCRF send a notification to the AF when a change in the IP address of the UE is required imminently. As a result, when the PCRF determines/decides that a change in the IP address of the UE is required imminently, the PCRF will send a RAR message to the AF, the RAR message including a Specific-Action AVP with a value of "CHANGE_OF_UE_$IP_{13}$ ADDRESS" in order to indicate that a change in the IP address of the UE will occur imminently.

The AF is further configured such that, upon receiving a notification that a change in the IP address of the UE is imminent, and before the change in the IP address takes place, it will increase a rate at which service data is sent to the UE and/or will decrease the quality of service for the service. By increasing the rate at which service data is sent to the UE, the AF can provide the UE with an increased volume of the data that the UE can then buffer. The increased volume of data stored in the buffer of the UE can therefore enable the UE to continue rendering data during the service interruption that subsequently occurs at the time of the change of IP address. By decreasing the quality of service for the service provided to the user (e.g. increasing the extent of data compression etc), the density of the data sent to the UE can be increased, thereby effectively increasing the volume of the data sent to the UE prior to the change in the IP address.

Upon determining that a change in the IP address of the UE has taken place, the AF is further configured to return/restore/adapt the rate at which service data is sent to the UE and/or the quality of service for the service to normal or appropriate levels. In this regard, the AF can be configured to receive a notification from the PCRF that the change in the IP address of the UE has taken place.

In addition to the mitigating action taken by the PCRF, and any mitigating action taken by the AF, the UE can also be configured to anticipate the change and take temporary actions to mitigate the service interruption perceived by the user of the UE. To do so, the UE is configured to receive a notification of an imminent change in the IP address of the UE, in accordance with the procedures outlined above. For example, the UE can be configured to receive a push SMS from the PCRF including an indication that a change in the IP address of the UE will occur imminently. Alternatively, the UE can be configured to receive a push SMS from an ANDSF instructing the UE to retrieve a new access network selection policy. As a result of the communication with the ANDSF, the UE would determine that an imminent change in the IP-CAN used by the UE is required, and that this implies that a change in the IP address of the UE will also be required.

The UE is further configured such that, upon receiving a notification that a change in the IP address of the UE is imminent, and before the change in the IP address takes place, it will increase the size of a receiving buffer and/or decrease the quality of service for the service and/or lower rendering consuming resources of the media at the UE (e.g. lowering the number of simultaneous colours, and/or lowering the resolution of the streamed media. In this regard, increasing the size of a receiving buffer enables the UE to store an increased amount of data received from the AF, and can therefore enable the UE to continue rendering/playing media to the user during the service interruption that subsequently occurs at the time of the change of IP address. Decrease the quality of service for the service allows the density of the data sent to the UE to be increased, thereby effectively increasing the volume of the data sent to the UE prior to the change in the IP address. Lowering the rendering consuming resources (i.e. the quality of the media when played by the UE) also allows the UE to lower the density of the media data that is to be stored in the buffer, thereby effectively increasing the volume of the data that can be stored in the buffer.

Upon determining that a change in the IP address of the UE has taken place, the UE is further configured to return/restore/adapt the size of a receiving buffer and/or the quality of service for the service and/or the rendering consuming resources to normal or appropriate levels.

Figure 2A:
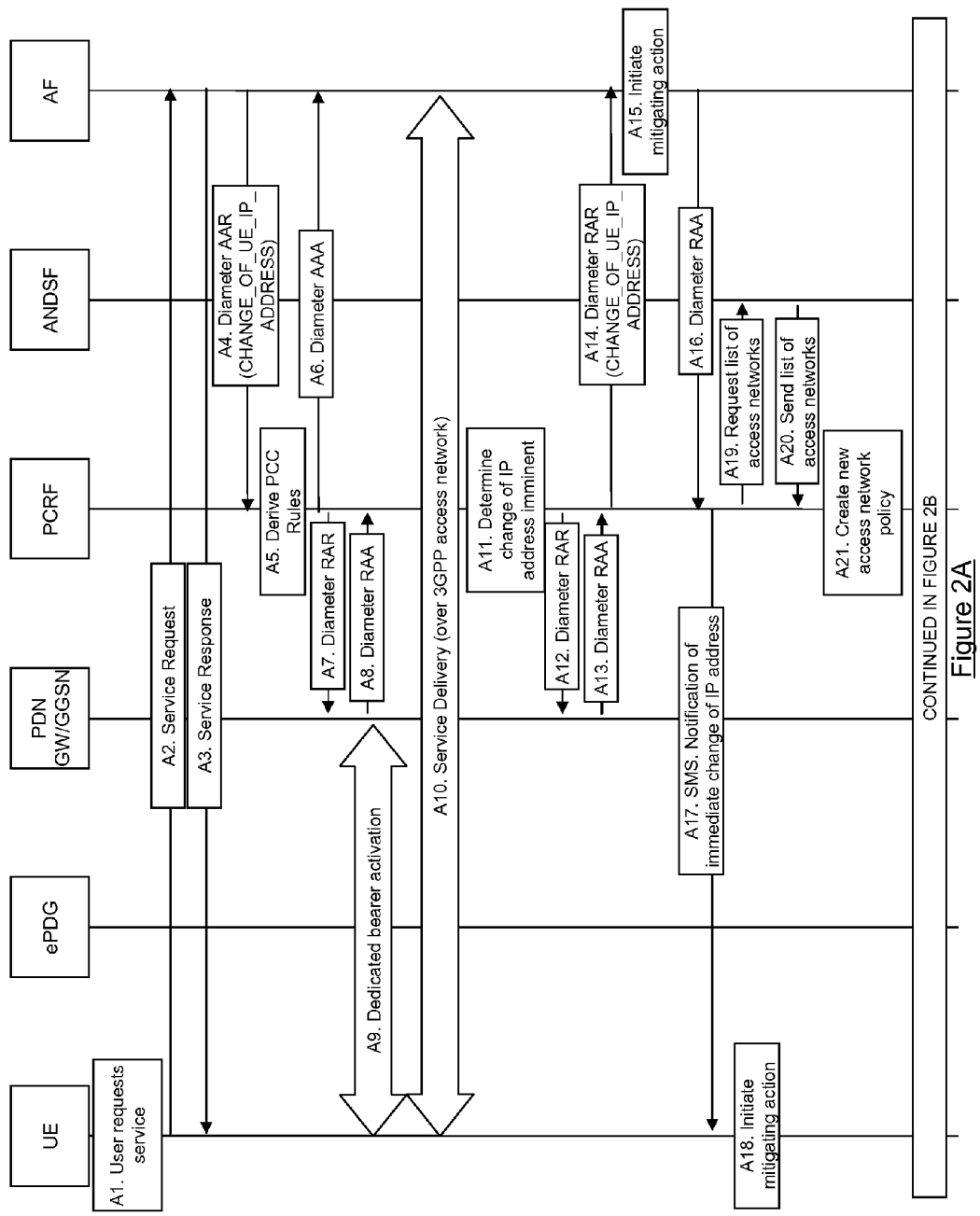
FIGS. 2A and 2B illustrate an example signalling flow in which service interruption mitigation is implemented according to the methods described herein.
Figure 2B:
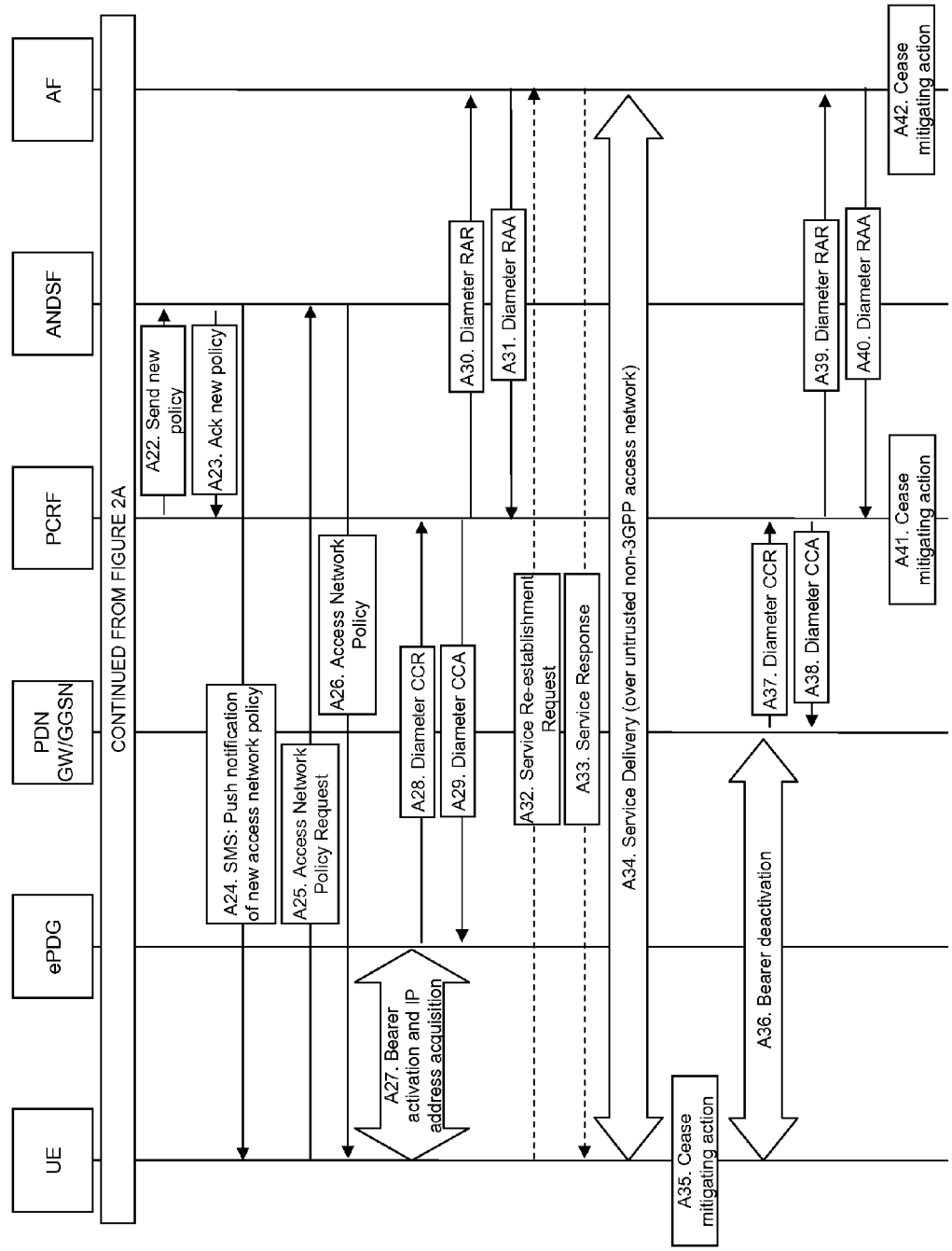

FIGS. 2A and 2B illustrate an example signalling flow in which the above-described method of mitigating service interruption that occurs due to a change in the IP address of a UE is implemented. In the example of FIGS. 2A and 2B, the change in the IP address of the UE occurs due to a change in the IP-CAN used by the UE from a 3GPP access network to an untrusted non-3GPP access network. However, this is merely an example, and the above-described methods are equally applicable to any scenario in which a change in the IP address of a UE is implemented. The steps performed are as follows:

A1. The user of the UE takes some action that causes the UE to invoke a service. For example, the user may initiate a web browsing or mobile TV app etc.

A2. The UE therefore generates and sends a request for the service to the AF that provides the service in order to establish a new AF session.

A3. The AF acknowledges receipt of the service request.

A4. The AF generates and sends a service authorisation request for the service to a PCRF. To do so, the AF generates a Diameter AAR message including the service/session information for the AF session and also including a Specific-Action AVP with a value of "CHANGE_OF_UE_IP ADDRESS" in order to request that the PCRF send a notification to the AF when a change in the IP address of the UE will occur imminently. The AF sends the AAR message to the PCRF of the PCC architecture over the Rx interface.

A5. The PCRF receives the AAR message from the AF, performs session binding that associates the service data flow with the IP-CAN bearer that is intended to transport the service data flow, checks that the session information received in the AAR is in accordance with the operator defined policies, and stores the information. The PCRF then determines the PCC rules that are to apply to the service according to the received information and the operator defined policies, including deriving the authorized QoS. The PCRF also recognizes that the Specific-Action AVP of the AAR message include a value of "CHANGE_OF_UE_IP_ADDRESS" and thereby determines that the AF has requested subscription to notification of when a change in the IP address of the UE will occur imminently.

A6. The PCRF responds to the AAR received from the AF by generating and sending an Authenticate and Authorize Answer (AAA) message to the AF.

A7. The PCRF also generates and sends a Re-Authorization Request (RAR) message to request that the PCEF implemented at the PDN GW installs, modifies or removes PCC rules in accordance with the PCC rules authorized by the PCRF. The RAR message also includes an Event-Trigger AVP with a value of LOSS_OF_BEARER to indicate that, upon loss of the bearer, the PDN GW should inform the PCRF.

A8. The PCEF implemented at the PDN GW installs the received PCC rules and will therefore enforce the authorized QoS on a bearer established for the service in accordance with the received PCC rules. The PCEF implemented at the PDN GW generates and sends a Re-Authorization Answer (RAA) to the PCRF to acknowledge the RAR message.

A9. The PCEF initiates IP-CAN bearer the establishment of a dedicated bearer for the service over the 3GPP access network currently used by the UE.

A10. As a result, the service provided by the AF is delivered to the UE over the 3GPP access network.

A11. Subsequently, the PCRF determines that a change in the IP address of the UE is required imminently. In this example, the PCRF determines/decides that the UE will imminently be required to change access network. For example, the PCRF determines that there is congestion in a cell, that the UE is to change location, that there is a change in the date or time, or that a resource usage threshold/quota has been reached etc.

A12. Upon determining that a change in the IP address of the UE is required imminently, the PCRF determines new PCC rules to apply to the service (i.e. to replace the PCC rules that are currently applied to the service) that increase the resources for the bearer established for the service. The PCC then sends these new PCC rules to the PCEF in a RAR message.

A13. The PCEF implemented at the PDN GW installs the new PCC rules, and sends a Re-Authorization Answer (RAA) to the PCRF to acknowledge the RAR message.

A14. The PCRF notifies the AF that a change in the IP address of the UE is required imminently by generating and sending a Diameter Re-Authorisation Request (RAR) message to the AF over the Rx interface. The RAR message includes a Specific-Action AVP with a value "CHANGE_OF_UE_IP_ADDRESS" that indicates to the AF that a change in the IP address of the UE is required imminently.

A15. Upon receipt of the RAR message from the PCRF including a notification that a change in the IP address of the UE is imminent, the AF initiates action that will mitigate the service interruption perceived by the user of the UE, as described above.

A16. The AF generates and sends a Re-Authorization Answer (RAA) to the PCRF to acknowledge the RAR message.

A17. The PCRF notifies the UE that a change in the IP address of the UE is required imminently by generating and sending a push SMS to the UE.

A18. Upon receipt of the push SMS at the UE, the SMS including a notification that a change in the IP address of the UE is imminent, the UE initiates action that will mitigate the service interruption perceived by the user of the UE, as described above.

A19. In this example, the PCRF has determined that a change in the IP address of the UE is imminent as it is required that the UE must change the IP-CAN through which it accesses the core network. The PCRF therefore interacts with an Access Network Discovery and Selection Function (ANDSF) in order to establish/dictate the access network selection policy (i.e. the inter-system mobility policy and/or inter-system routing policy) that the UE will use to select the access technology type or access network that should be used to route the service data flow through the PCEF. To do so, the PCRF generates and sends a request for a list of access networks available in the vicinity of the UE to the ANDSF. In this regard, it is noted that the current standards do not define an interface between the PCRF and the ANDSF.

A20. The ANDSF responds to the request from the PCRF by generating and sending a message including a list of access networks available in the vicinity of the UE.

A21. The PCRF receives the list of access networks from the ANDSF and uses the list to generate/create the access network selection policy.

A22. The PCRF generates and sends a message to the ANDSF including the new the access network selection policy.

A23. The ANDSF acknowledges receipt of the new the access network selection policy.

A24. The ANDSF then initiates data transfer to the UE using a push mechanism to notify the UE that a new access network selection policy is available. For example, the ANDSF can generate and send a push SMS to the UE instructing the UE to retrieve a new policy.

A25. The UE receives the push notification from the ANDSF and therefore generates and sends a request for retrieving access network discovery information to the ANDSF. For example, the UE could send the request using a HTTP POST request.

A26. The ANDSF responds to the UE by generating and sending a message including at least the new access network selection policy received from the PCRF. For example, the ANDSF could send a HTTP 200 OK response.

A27. The UE then uses the access network selection policy received from the ANDSF to determine which access network the UE should use to route the service data flow to the core network. In this example, the UE determines that it should route the service data flow through an untrusted non-3GPP access network that is in the vicinity of the UE. The UE thereby determines that an imminent change in the IP-CAN used by the UE is required, attaches to the non-3GPP access network, obtains a new IP address from the new access network, and initiates establishment of an IP-CAN bearer in the new access network to the ePDG.

A28. The ePDG generates and sends an initial Credit Control Request (CCR) message to the PCRF in order to request authorisation for the establishment of the new IP-CAN bearer and PCC rules.

A29. The PCRF receives the CCR message from the ePDG, makes the authorization and policy decision, and generates and sends a Credit Control Answer (CCA) message including the PCC rules.

A30. The PCRF then generates and sends a RAR message to the AF to notify the AF that a new IP-CAN bearer has been established (e.g. by including the IP-CAN_CHANGE value in the Specific-Action AVP of the RAR message).

A31. The AF generates and sends a RAA message to the PCRF to acknowledge the RAR message.

A32. The UE may then be required to send application level signalling to the AF in order to re-establish the service. If this is the case, then the UE will provide an indication of its new IP address, as well as an indication of the last data received from the AF over the IP-CAN bearer established via the initial access network. For example, the AF could include an indication of the sequence number or byte count of the last data received.

A33. If the UE does request re-establishment of the service, then the AS acknowledges this request.

A34. The AF resumes provision of the service to the UE over the untrusted non-3GPP access network.

A35. Once the UE is receiving the service from the AF over the new access network, the UE determines that the change in the IP address of the UE has occurred and therefore stops/terminates any temporary mitigating actions that it has been implementing.

A36. In addition, if it is required following the evaluation of the policy received from the ANDSF in step A25, the UE interacts with the PDN GW to deactivate and release the IP-CAN bearer established over the initial IP-CAN.

A37. The PDN GW then generates and sends a CCR message to the PCRF, and includes an Event-Trigger AVP with a value of LOSS_OF_BEARER to indicate that bearer associated with the PCC rules has been lost.

A38. The PCRF generates and sends a CCA message to the PCRF to acknowledge the CCR message.

A39. The PCRF then notifies the AF that the IP-CAN bearer in the initial access network has been lost by generating and sending a RAR message.

A40. The AF generates and sends a RAA message to the PCRF to acknowledge the RAR message.

A41. Upon receipt of the CCR message from the PDN GW indicating that the IP-CAN bearer within the initial access network has been lost, the PCRF determines that the change in the IP address of the UE has taken place, and therefore stops/terminates any temporary mitigating actions that it has been implementing.

A42. Similarly, upon receipt of the RAR message from the PCRF indicating that the IP-CAN bearer within the initial access network has been lost, the AF determines that the change in the IP address of the UE has taken place, and therefore stops/terminates any temporary mitigating actions that it has been implementing.

FIG. 3 illustrates schematically an example of a PCRF 10 configured to mitigate a service interruption that occurs due to a change of an IP address of a UE in accordance with the methods described above. The PCRF 10 can be implemented as a combination of computer hardware and software. The PCRF 10 comprises a processor 11, a memory 12, a receiver 13 and a transmitter 14. The memory 12 stores the various programs/executable files that are implemented by the processor 11, and also provides a storage unit for any required data. The programs/executable files stored in the memory 12, and implemented by the processor 11, include but are not limited to a PCC rules unit 15, a determination unit 16, and a notification unit 17.

Figure 4:
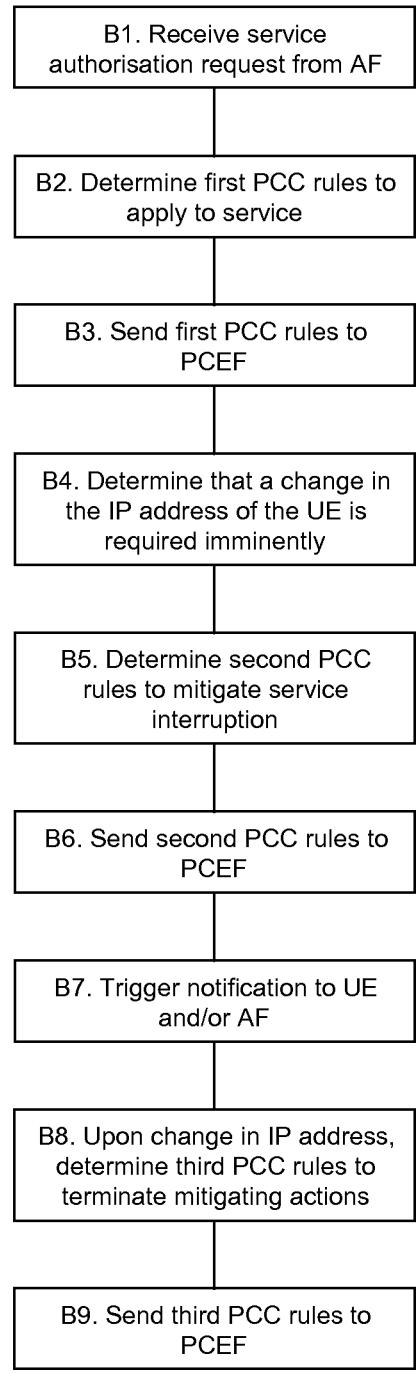
FIG. 4 is a flow diagram illustrating the steps performed by a PCRF in order to mitigate service in accordance with the methods described herein.

FIG. 4 is a flow diagram illustrating the steps performed by a PCRF in order to mitigate a service interruption that occurs due to a change of an IP address of a UE that is receiving a service under control of a Policy and Charging Control (PCC). The steps performed are as follows:

B1. The receiver 12 receives a service authorization request for the service from the AF that is in charge of service delivery to the UE.

B2. The PCC rules unit 15 then determines first PCC rules that are to apply to the service.

B3. The transmitter 14 then sends the first PCC rules to the PCEF that is responsible for enforcement of quality of service on a bearer established for the service.

B4. Subsequently, the determination unit 16 determines that a change of the IP address of the UE is required imminently.

B5. Before the change of the IP address takes place, the PCC rules unit 15 determines second PCC rules that are to apply to the service, to replace the first PCC rules, such that the resources for the bearer are increased in order to mitigate the service interruption perceived at the UE.

B6. The transmitter 14 then sends the second PCC rules to the PCEF.

B7. The notification unit 17 then triggers a notification of the imminent change of the IP address of the UE to the UE and/or the AF.

B8. Upon determining that the change of the IP address of the UE has taken place, the PCC rules unit 15 determines third PCC rules that are to apply to the service, to replace the second PCC rules, such that the resources for the bearer are returned/restored to levels that correspond with those provided by the first PCC rules.

B9. The transmitter 14 then sends the third PCC rules to the PCEF.

FIG. 5 illustrates schematically an example of an AF 20 configured to mitigate a service interruption that occurs due to a change of an IP address of a UE in accordance with the methods described above. The AF 20 can be implemented as a combination of computer hardware and software. The AF 20 comprises a processor 21, a memory 22, a receiver 23 and a transmitter 24. The memory 22 stores the various programs/executable files that are implemented by the processor 21, and also provides a storage unit for any required data. The programs/executable files stored in the memory 22, and implemented by the processor 21, include but are not limited to a mitigation unit 25, a subscription unit 26, and a determination unit 27.

FIG. 6 is a flow diagram illustrating the steps performed by an AF in order to mitigate a service interruption that occurs due to a change of an IP address of a UE that is receiving a service from the AF under control of a Policy and Charging Control (PCC) architecture. The steps performed are as follows:

C1. Optionally, the subscription unit 26 can send a subscription to a PCRF of the PCC architecture, to subscribe to a notification of an imminent change of the IP address of the UE C2. The receiver 23 receives a notification from the PCRF of an imminent change of the IP address of the UE.

C3. Before the change of the IP address takes place, the mitigation unit 25 performs at least one of increasing a rate at which service data is sent to the UE and decreasing the quality of service for the service.

C4. The determination unit 27 then determines that the change in the IP address of the UE has taken place (i.e. upon receipt of a notification from the PCRF).

C5. Upon determining that the change of the IP address of the UE has taken place, the mitigation unit 25 then restores the at least one of the rate at which service data is sent to the UE and the quality of service for the service.

Figure 7:
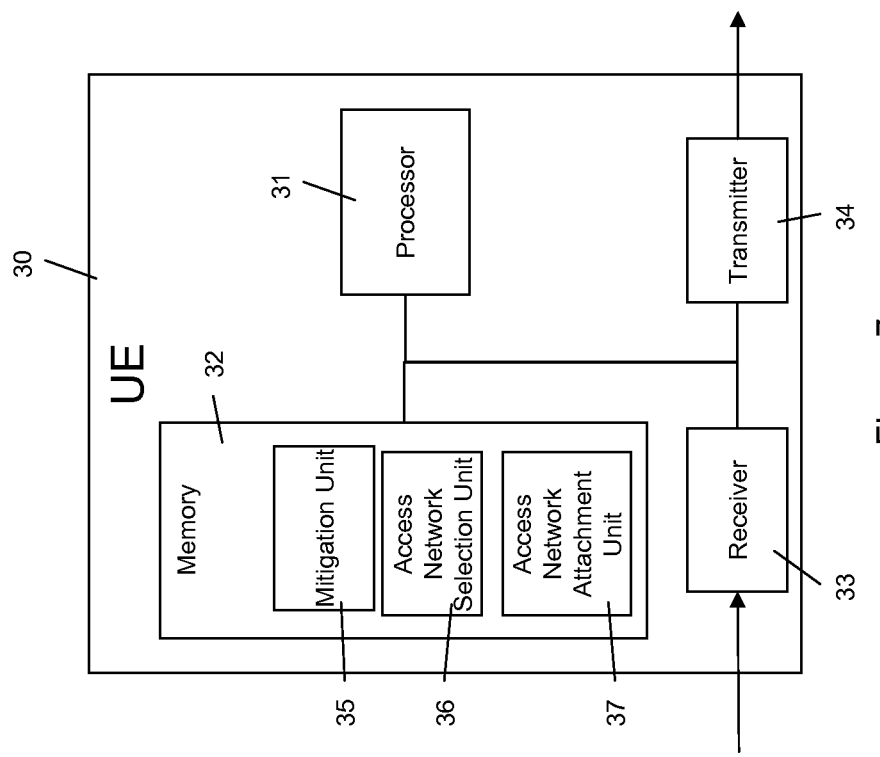
FIG. 7 illustrates schematically an example of a UE configured to mitigate service interruption in accordance with the methods described herein.

FIG. 7 illustrates schematically an example of a UE 30 configured to mitigate a service interruption that occurs due to a change of an IP address of the UE in accordance with the methods described above. The UE 30 can be implemented as a combination of computer hardware and software. The UE 30 comprises a processor 31, a memory 32, a receiver 33 and a transmitter 34. The memory 32 stores the various programs/executable files that are implemented by the processor 31, and also provides a storage unit for any required data. The programs/executable files stored in the memory 32, and implemented by the processor 31, include but are not limited to a mitigation unit 35, an access network selection unit 36, and an access network attachment unit 37.

FIG. 8 is a flow diagram illustrating the steps performed by an AF in order to mitigate a service interruption that occurs due to a change of an IP address of a UE that is receiving a service from the AF under control of a Policy and Charging Control (PCC) architecture. The steps performed are as follows:

D1. The receiver 33 receives a notification of an imminent change of the IP address of the UE.

D2. Before the change of the IP address takes place, the mitigation unit 35 performs at least one of increasing size of a receiving buffer, and decreasing the quality of service for the service, and lowering rendering consuming resources at the UE D3. The mitigation unit 35 subsequently determines that the change in the IP address has taken place.

D4. Upon a determination that the change of the IP address of the UE has taken place, the mitigation unit 35 then restores the at least one of the size of a receiving buffer, the quality of service for the service, and the rendering consuming resources at the UE.

As described above, the notification of an imminent change of the IP address of the UE may be received at the UE from an ANDSF. In this case, the notification received from the ANDSF can include an access network selection policy. The access network selection unit 36 will then use the access network selection policy to select a new access network to be used by the UE to route service data flows of the service. Consequently, the access network attachment unit 37 will attach to the new access network in accordance with the access network selection policy, initiate the establishment of a new bearer in the new access network, and obtain a new IP address of the UE from the new access network.

It will be appreciated by the person of skill in the art that various modifications may be made to the above-described embodiments without departing from the scope of the present invention. For example, whilst the above-described examples describe the PCRF determining that a change of the IP address of the UE is required imminently by detecting specific evens, it is also possible that the time at which such change of the IP address of the UE can be scheduled and is therefore configurable.

The invention claimed is:

1. A method of mitigating a service interruption that occurs due to a change of an IP address of a User Equipment (UE) that is receiving a service under control of a Policy and Charging Control (PCC) architecture, the method at a Policy and Charging Control Rules Function (PCRF) of the PCC architecture, the method comprising:
    receiving a service authorization request for the service from an Application Function, AF, in charge of service delivery to the UE;
    determining first PCC rules to apply for the service and submitting said first PCC rules to a Policy and Charging Enforcement Function (PCEF) of the PCC architecture for enforcement of quality of service on a bearer established for the service through a first access network, which is currently used by the UE to route service data flows of the service;
    determining that a change from the first access network to a second access network is required imminently and that a change of the IP address of the UE is to take place;
    before the change of the IP address takes place, determining and submitting to the PCEF second PCC rules to apply an increase in resources for the bearer in order to mitigate the service interruption to be caused by the change of the IP address of the UE;
    triggering a notification of an imminent change of the IP address of the UE to at least one of the UE and the AF;
    determining, in response to a request from the PCEF for authorizing a new bearer and for PCC rules for the second access network, that the change of the IP address of the UE has taken place; and
    determining and submitting to the PCEF third PCC rules to apply that discontinue the mitigating increase in the resources for the bearer.

2. The method of claim 1, and further comprising a step of, upon determining that the change of the IP address of the UE has taken place, sending a notification to the AF that the change of the IP address of the UE has taken place.

3. The method of claim 1, wherein upon determining that a change from a first access network to a second access network is required imminently, the method further comprises a step of:
    sending a notification of an imminent change of the IP address of the UE to an Access Network Discovery and Selection Function (ANDSF) in order to establish an access network selection policy for the UE selecting the second access network.

4. A method of mitigating a service interruption that occurs due to a change of an IP address of a User Equipment (UE) that is receiving a service under control of a Policy and Charging Control (PCC) architecture, the method at an Application Function (AF) of the PCC architecture, the method comprising:
    submitting a service authorization request for the service to a Policy and Charging Control Rules Function (PCRF) of the PCC architecture;
    receiving a notification, from the PCRF, of an imminent change of the IP address of the UE due to a change from a first access network, which is currently used by the UE to route service data flows of the service to a second access network;
    before the change of the IP address takes place, performing at least one of increasing a rate at which service data is sent to the UE and decreasing the quality of service for the service, in order to mitigate the service interruption to be caused by the change of the IP address of the UE;
    determining, in response to receiving from the PCRF a notification of the establishment of a new bearer for the service, that a change of the IP address of the UE has taken place; and
    discontinuing any mitigating change in the at least one of the rate at which service data is sent to the UE and the quality of service for the service.

5. A method of mitigating a service interruption that occurs due to a change of an IP address of a User that is receiving a service under control of a Policy and Charging architecture, the method at the UE, the method comprising:
    receiving a notification of an imminent change of the IP address of the UE, the notification received from an Access Network Discovery and Selection Function (ANDSF) in charge of establishing policies for the UE and including an access network selection policy;
    before the change of the IP address takes place, performing at least one of increasing size of a receiving buffer, decreasing the quality of service for the service, and lowering rendering consuming resources at the UE, in order to mitigate the service interruption to be caused by the change of the IP address of the UE;
    using the access network selection policy to select a new access network to be used by the UE to route service data flows of the service; and
    discontinuing any mitigating change in the at least one of the size of a receiving buffer, the quality of service for the service, and the rendering consuming resources at the UE.

6. The method of claim 5, wherein the notification of an imminent change of the IP address of the UE is triggered from a Policy and Charging Control Rules Function (PCRF) of the PCC architecture.

7. A Policy and Charging Control Rules Function (PCRF) of a Policy and Charging Control (PCC) architecture, that is configured to mitigate a service interruption that occurs due to a change of an IP address of a User Equipment (UE) that is receiving a service under control of the PCC architecture, the PCRF comprising:
    a receiver configured to receive a service authorization request for the service from an Application Function (AF) in charge of service delivery to the UE;
    at least one processor in communication with the receiver, the at least one processor configured to determine first PCC rules to apply for the service;
    a transmitter configured to send said first PCC rules to a Policy and Charging Enforcement Function (PCEF) of the PCC architecture for enforcement of quality of service on a bearer established for the service through a first access network, which is currently used by the UE to route service data flows of the service;
    the at least one processor further configured to:
        determine that a change from the first access network to a second access network is required imminently and that a change of the IP address of the UE is to take place;
        before the change of the IP address takes place, determine second PCC rules to apply an increase in resources for the bearer in order to mitigate the service interruption to be caused by the change of the IP address of the UE;
    the transmitter being further configured to send the second PCC rules to the PCEF;
    the at least one processor further configured to:
        trigger a notification of an imminent change of the IP address of the UE to at least one of the UE and the AF;
        determine that the change of the IP address of the UE has taken place upon receipt from the PCEF of a request for authorizing a new bearer and for PCC rules for the second access network;

upon a determination that the change of the IP address of the UE has taken place, determine third PCC rules to apply that discontinue the mitigating increase in the resources for the bearer; and the transmitter being further configured to send the third PCC rules to the PCEF.

8. The PCRF of claim 7, wherein the at least one processor is further configured to trigger a notification of an imminent change of the IP address of the UE to the UE by generating and sending a notification to the UE.

9. The PCRF of claim 7, wherein, upon determining that a change from a first access network to a second access network is required imminently, the at least one processor is further configured to send a notification of an imminent change of the IP address of the UE to an Access Network Discovery and Selection Function (ANDSF) in order to establish an access network selection policy for the UE selecting the second access network.

10. An Application Function (AF) of a Policy and Charging Control (PCC) architecture that is configured to mitigate a service interruption that occurs due to a change of an IP address of a User Equipment (UE) that is receiving a service from the AF under control of the PCC architecture, the AF comprising:

a transmitter configured to submit a service authorization request for the service to a Policy and Charging Control Rules Function (PCRF) of the PCC architecture;

a receiver configured to receive a notification from the PCRF of an imminent change of the IP address of the UE due to a change from a first access network, which is currently used by the UE to route service data flows of the service, to a second access network;

at least one processor configured to:
before the change of the IP address takes place, perform at least one of increasing a rate at which service data is sent to the UE and decreasing the quality of service for the service, in order to mitigate the service interruption to be caused by the change of the IP address of UE; and upon determining that the change of the IP address of the UE has taken place, discontinue any mitigating change in the at least one of the rate at which service data is sent to the UE and the quality of service for the service.

11. A User Equipment (UE) configured to receive a service under control of a Policy and Charging Control (PCC) architecture and to mitigate a service interruption that occurs due to a change of an IP address of the UE, the UE comprising:

a receiver configured to receive a notification of an imminent change of the IP address of the UE, the notification received from an Access Network Discovery and Selection Function (ANDSF) in charge of establishing policies for the UE and including an access network selection policy;

at least one processor configured to:
before the change of the IP address takes place, perform at least one of increasing size of a receiving buffer, decreasing the quality of service for the service, and lowering rendering consuming resources at the UE, in order to mitigate the service interruption to be caused by the change of the IP address of the UE; and upon determining that the change of the IP address of the UE has taken place, discontinue any mitigating change in the at least one of the size of a receiving buffer, the quality of service for the service, and the rendering consuming resources at the UE.

* * * * *

UNITED STATES PATENT AND TRADEMARK OFFICE
CERTIFICATE OF CORRECTION

PATENT NO. : 9,191,960 B2  
APPLICATION NO. : 13/896707  
DATED : November 17, 2015  
INVENTOR(S) : Garcia Martin et al.

Page 1 of 1

It is certified that error appears in the above-identified patent and that said Letters Patent is hereby corrected as shown below:

On the Title Page, in Item (72), under "Inventors", in Column 1, Line 2, delete "de Alarcon" and insert -- de Alarcón --, therefor.

On the Title Page, in Item (57), under "ABSTRACT", in Column 2, Line 10, delete "a notifications" and insert -- a notification --, therefor.

In the Specification:

In Column 10, Line 36, delete "OF_UE_IP$_{13}$ ADDRESS"" and insert -- OF_UE_IP_ADDRESS" --, therefor.

In Column 15, Line 9, delete "receiver 12" and insert -- receiver 13 --, therefor.

In the Claims:

In Column 20, Line 7, in Claim 10, delete "UE;" and insert -- the UE; --, therefor.

Signed and Sealed this  
Twenty-sixth Day of July, 2016

Michelle K. Lee  
*Director of the United States Patent and Trademark Office*